Patented Jan. 7, 1941

2,227,478

UNITED STATES PATENT OFFICE 2,227,478

PROCESS OF PREPARING ALIPHATIC POLYMERS OF ACETYLENE

Arthur Wolfram, Frankfort-on-the-Main-Rodelheim, Helmut Jockusch, Bad Soden in Taunus, and Albert Perlick, Hollriegels Kreuth, near Munich, Germany, assignors to I. G. Farbenindustrie Aktiengesellschaft, Frankfort-on-the-Main, Germany No Drawing. Application August 2, 1939, Serial No. 288,060. In Germany August 3, 1938

5 Claims. (Cl. 260—678)

The present invention relates to a process of preparing aliphatic polymers of acetylene.

It is known that aliphatic polymers of acetylene can be made by operating in the presence of an aqueous contact solution containing a cuprous salt (best cuprous chloride) and the salt of an amine base (preferably ammonium chloride). It has also been proposed to substitute an organic acid or a mixture of organic acids for the water used as solvent. Another proposal is to substitute an alcohol, a glycol, glycerol or a mixture of these compounds for the water. These solvents could not, however, be applied on a commercial scale: either they dissolve too little of the cuprous chloride and the amine salt or the contacts resinify too easily. Water, therefore, remained the only solvent to be used for the cuprous and amine salts. Working in an aqueous contact solution, however, entails unnecessary difficulties in the process. The reaction being performed at a temperature above 65° C., the circulating gas carries forward much water vapour which has to be removed before the separation of the acetylene-polymer. On the other hand, the circulating gas must again be loaded with water before entering the reaction vessel.

We have found that the process of polymerising acetylene may advantageously be performed in solvents other than water if they have the following properties: They must be good solvents for cuprous salts and amine salts and, at the same time, be capable of dissolving acetylene to a high degree. At the temperature of the reaction, the vapour pressure of the solvent must be as low as possible. Since it is not only material that the cuprous salt be present in the solution, but also that ions of the monovalent copper shall be present, it is necessary in particular that the solvent should have a high dielectric constant.

Carboxylic acid amides, especially formamide have proved to be very suitable for this purpose; the formamide boils at 220° C. and its vapour pressure, at a temperature of 70° C., amounts to about 3 to 4 mm. Its dielectric constant is higher than that of water, namely 94. The dissolving action of formamide as regards acetylene is, likewise, better than that of water.

Instead of the formamide other acid amides may be used, especially such amides of aliphatic monocarboxylic acid as melt at temperatures not exceeding about 80° C. Thus, for instance acetamide is suitable. It melts at 80° C. and has a dielectric constant of 50. In the presence of amine salts it is a good solvent for cuprous salts. The solvent power of acetamide with respect to acetylene is, likewise, high. Other suitable solvents are N-dimethyl formamide, N-methyl formamide, N-diethyl formamide, N-ethyl formamide, and propionic acid amide.

The amides must be used in quantities which are suitable to dissolve at least one substantial part of the catalyst. There may also be used mixtures of amides.

The process may be carried out according to the processes described in U. S. A. Patents No. 1,811,959, 1,867,857, 1,926,039, 1,926,055, 1,926,056, 2,048,838 and British Patent No. 438,548. The catalysts named in these patents are suitable. In all these processes at least part of the water or of the non-aqueous solvent used may be replaced by an amide according to the present invention. It is a preferred method of the present process to work practically in the absence of water.

The following examples serve to illustrate the invention, but they are not intended to limit it thereto:

1. Acetylene is introduced at the bottom of a vertical tube of which the ratio of the diameter to the height is 1:25. This tube contains 1.955 litres of a contact having the following composition:

1.1 litres of formamide
100 cc. of a solution of hydrogen chloride in formamide
1 kg. of cuprous chloride and
535 grams of ammonium chloride.

200 litres of acetylene are, at normal pressure, passed per hour through this contact, 55.5 grams of crude product being separated per hour from the exit gas by cooling to a low temperature, that is 28.2 grams of crude product are produced per litre of contact.

The distillation of the crude product yielded the following components:

| | Percent by weight |
|---|---|
| Acetylene | 2.01 |
| First runnings of monovinylacetylene (containing acetylene) | 1.25 |
| Pure monovinylacetylene | 57.0 |
| Last runnings of monovinylacetylene | 12.75 |
| Divinylacetylene and higher polymers | 26.9 |

When the amount of circulating acetylene is increased, the ratio of the yield of monovinylacetylene to that of divinylacetylene is displaced in favour of the monovinylacetylene.

2. A stirring flask contains a contact consisting of 250 grams of acetamide, a solution of 5 grams of hydrogen chloride in 50 grams of acetamide, 100 grams of cuprous chloride and 53.5 grams of ammonium chloride. At a temperature of 80° C. to 85° C., 144 litres of acetylene are passed through within 2 hours, 28 grams of a liquid condensate being separated. The crude product consists of vinylacetylene and of higher polymers.

We claim:

1. In the process of preparing vinyl derivatives of acetylene by reacting the acetylene in the presence of a catalyst containing a cuprous salt the step which comprises carrying out the process in the presence of a carboxylic acid amide as a solvent.

2. In the process of preparing vinyl derivatives of acetylene by reacting the acetylene in the presence of a catalyst containing a cuprous salt the step which comprises carrying out the process in the presence of an amide of an aliphatic monocarboxylic acid as a solvent, said amide having a melting point of at most about 80° C.

3. In the process of preparing vinyl derivatives of acetylene by reacting the acetylene in the presence of a non-aqueous catalyst containing a cuprous salt the step which comprises carrying out the process in the presence of an amide of an aliphatic monocarboxylic acid as a solvent, said amide having a melting point of at most about 80° C.

4. In the process of preparing vinyl derivatives of acetylene the step which comprises reacting the acetylene in the presence of a non-aqueous catalyst containing formamide as a solvent, hydrogen chloride, cuprous chloride and ammonium chloride.

5. In the process of preparing vinyl derivatives of acetylene the step which comprises reacting the acetylene in the presence of a non-aqueous catalyst containing acetamide as a solvent, hydrogen chloride, cuprous chloride and ammonium chloride.

ARTHUR WOLFRAM.
HELMUT JOCKUSCH.
ALBERT PERLICK.